US012106889B2

(12) United States Patent
Gradinger et al.

(10) Patent No.: US 12,106,889 B2
(45) Date of Patent: Oct. 1, 2024

(54) ELECTRICAL COMPONENT, ESPECIALLY TRANSFORMER OR INDUCTOR

(71) Applicant: Hitachi Energy Ltd, Zürich (CH)

(72) Inventors: Thomas Bernhard Gradinger, Aarau Rohr (CH); Uwe Drofenik, Zürich (CH)

(73) Assignee: Hitachi Energy Ltd, Zürich (CH)

( * ) Notice: Subject to any disclaimer, the term of this patent is extended or adjusted under 35 U.S.C. 154(b) by 827 days.

(21) Appl. No.: 17/289,350

(22) PCT Filed: Oct. 29, 2019

(86) PCT No.: PCT/EP2019/079529
§ 371 (c)(1),
(2) Date: Apr. 28, 2021

(87) PCT Pub. No.: WO2020/089228
PCT Pub. Date: May 7, 2020

(65) Prior Publication Data

US 2021/0398742 A1 Dec. 23, 2021

(30) Foreign Application Priority Data

Oct. 31, 2018 (EP) .................................... 18203718

(51) Int. Cl.
*H01F 27/34* (2006.01)
*H01F 27/24* (2006.01)
*H01F 27/28* (2006.01)

(52) U.S. Cl.
CPC ............. *H01F 27/34* (2013.01); *H01F 27/24* (2013.01); *H01F 27/2828* (2013.01)

(58) Field of Classification Search
CPC ....................................................... H01F 27/34
(Continued)

(56) References Cited

U.S. PATENT DOCUMENTS 2,357,098 A * 8/1944 Garin .................... H01F 27/385 307/17
2,553,324 A * 5/1951 Lord ....................... H01F 27/36 336/84 R (Continued)

FOREIGN PATENT DOCUMENTS

CN 101707121 A 5/2013
CN 105551771 A 5/2016

(Continued)

OTHER PUBLICATIONS

Notice of Reasons for Refusal, Japanese Patent Application No. 2021-523417, mailed Nov. 15, 2022, 5 pages.

(Continued)

*Primary Examiner* — Ronald Hinson
(74) *Attorney, Agent, or Firm* — Sage Patent Group

(57) ABSTRACT

An electrical component includes a ferromagnetic core with a first and a second leg; a primary winding with a first primary winding portion arranged around the first leg of the ferromagnetic core and a second primary winding portion arranged around the second leg of the ferromagnetic core; wherein the first primary winding portion and the second primary winding portion each include parallel connectable conductors arranged around the ferromagnetic core in a cross section with the conductors being radially displaced with respect to each other at radial row positions, wherein the number of conductors of the first primary winding portion is equal the number of conductors of the second primary winding portion.

15 Claims, 4 Drawing Sheets

(58) Field of Classification Search
USPC .......................................................... 336/147
See application file for complete search history.

(56) References Cited

U.S. PATENT DOCUMENTS

| | | | | | |
|---|---|---|---|---|---|
| 2,962,600 | A * | 11/1960 | Preininger | H01F 27/28 | 336/170 |
| 3,579,165 | A * | 5/1971 | Johnson | H01F 27/28 | 336/170 |
| 3,585,484 | A * | 6/1971 | Dortort | H01F 27/289 | 336/170 |
| 3,611,228 | A * | 10/1971 | Walling | H01F 29/02 | 336/147 |
| 3,774,135 | A * | 11/1973 | Kashima | H01F 27/2828 | 336/84 R |
| 4,329,674 | A * | 5/1982 | Hamano | H01F 27/42 | 336/170 |
| 4,581,573 | A * | 4/1986 | Dobsa | H01F 27/38 | 323/356 |
| 6,049,266 | A | 4/2000 | Hoshino et al. | | |
| 2014/0333408 | A1* | 11/2014 | Gutierrez Estrada | H01F 27/24 | 242/433 |
| 2014/0347153 | A1* | 11/2014 | Moon | H01F 27/34 | 336/105 |

FOREIGN PATENT DOCUMENTS

| | | | |
|---|---|---|---|
| EP | 0980035 | A1 | 2/2000 |
| JP | S46-015365 | Y | 5/1971 |
| JP | S52-147724 | A | 12/1977 |
| JP | S59-011607 | A | 1/1984 |
| JP | 2000-058342 | A | 2/2000 |
| JP | 2005136199 | A | 5/2005 |
| JP | 2011-199143 | A | 10/2011 |
| JP | 2012-119617 | A | 6/2012 |
| JP | 2015-115340 | A | 6/2015 |
| WO | WO 2012/017616 | A1 | 2/2012 |
| WO | WO 2018/007514 | A1 | 1/2018 |

OTHER PUBLICATIONS

First Office Action, Chinese Patent Application No. 201980071065.6, mailed Oct. 20, 2021, 5 pages.

Notice of Reasons for Refusal, Japanese Patent Application No. 2021-523417, mailed Jun. 7, 2022, 8 pages.

Reconsideration Report before Appeal, Japanese Patent Application No. 2021-523417, mailed Aug. 7, 2023, 5 pages.

International Search Report and Written Opinion of the International Searching Authority, PCT/EP2019/079529, mailed Jan. 31, 2020, 12 pages.

European Search Report, EP18203718.4, mailed Apr. 26, 2019, 5 pages.

* cited by examiner

ELECTRICAL COMPONENT, ESPECIALLY TRANSFORMER OR INDUCTOR

CROSS REFERENCE TO RELATED APPLICATIONS

This application is a 35 U.S.C. § 371 national stage application of PCT International Application No. PCT/EP2019/079529 filed on Oct. 29, 2019, which in turns claims foreign priority to European Patent Application No. 18203718.4, filed on Oct. 31, 2018, the disclosures and content of which are incorporated by reference herein in their entirety.

TECHNICAL FIELD

Embodiments of the present disclosure relate to electrical components having a winding arrangement for high voltage applications. In particular, embodiments of the present disclosure relate to transformers, particularly oil-immersed transformers or dry-cast medium-frequency transformers (MFTs), and inductors.

BACKGROUND

Medium-frequency transformers (MFTs) are key components in various power-electronic systems. Examples in rail vehicles are auxiliary converters and solid-state transformers (SSTs) replacing the bulky low-frequency traction transformers. Further applications of SSTs are being considered, for example for grid integration of renewable energy sources, electrical vehicle (EV) charging infrastructure, data centers, or power grids on board of ships. It is expected that SSTs will play an increasingly important role in the future.

Due to operating frequencies in the range of tens of kHz, MFT windings are often made from litz wires or foils to keep skin- and proximity-effect losses within tolerable limits.

As soon as two or more litz wires or foils are connected in parallel, there is a risk of circulating currents among the wires introduced by a magnetic flux. These currents have the potential of strongly, e.g. by a factor of 2, increasing the winding losses beyond those just caused by skin and proximity effect at the level of individual wires or foils.

The same problems appears in inductors having a plurality of parallel connected conductors, for example litz wires or foils.

Thus, there is a need of a solution that reduces the circulating current in parallel circuits of conductors in electrical components. Careful winding design is needed to avoid those circulating currents.

SUMMARY

In light of the above, an electrical component, especially a transformer or an inductor, is provided. Further aspects, advantages, and features are apparent from the dependent claims, the description, and the accompanying drawings.

According to an aspect of the present disclosure, an electrical component is suggested. The electrical component comprises a ferromagnetic core with a first and a second leg; a primary winding with a first primary winding portion arranged around the first leg of the ferromagnetic core and a second primary winding portion arranged around the second leg of the ferromagnetic core; wherein the first primary winding portion and the second primary winding portion each comprise a plurality of conductors connectable in parallel and arranged around the ferromagnetic core in a cross section with the conductors being radially displaced with respect to each other at radial row positions, wherein the number of conductors of the first primary winding portion is equal the number of conductors of the second primary winding portion and each of the conductors of the first primary winding portion is connected in series with one corresponding conductor of the second primary winding portion, whereby a conductor of a radially outer row of the first primary winding portion is connected in series with a conductor of a radially inner row of the second primary winding portion, thereby reducing the sum of the magnetic flux between parallel connectable conductors of the first primary winding portion and parallel connectable conductors of the second primary winding portion.

Accordingly, the design of the electrical component of the present disclosure is improved compared to conventional structure of this kind of electrical components. In particular, the reduction of the sum of the magnetic flux or the total magnetic flux of the primary winding between parallel connectable conductors of the first and second primary winding portions is with respect to a situation in which the conductor of a radially outer row of the first primary winding portion is connected in series with a conductor of a radially outer row of the second primary winding portion. In other words, a transposition of the radial conductor position on the first leg with respect to the radial conductor position on the second leg is suggested.

The term "connectable in parallel" describing the conductors should be understood in that the conductors are not electrically connected in series. Furthermore, the conductors can be separated from each other by, for example, an isolator. Typical conductors are, for example, litz wires arranged in a cable formed of a group of litz wires or foils arranged as a stack of layers. It should be understood that connectable in parallel does not necessarily mean the conductors form an electrical parallel circuit inside the device. The actual electrical connection of the parallel conductors can be a part of the electrical component or can be externally within a suitable usage of the electrical component. Connectable in parallel should be understood as at least connectable in an electrical parallel circuit.

The arrangement of the primary winding with a first primary winding portion arranged around the first leg of the ferromagnetic core and a second primary winding portion arranged around the second leg of the ferromagnetic core is also known as core-type, for example, in core-type transformers The plurality of parallel connectable conductors are arranged around the ferromagnetic core in a cross section with the conductors being radially displaced with respect to each other at radial row positions. In other words, the conductors surround the first or second leg, respectively, at different radii. Due to the different radii, there is a magnetic flux in axial direction of the first and second primary winding portion, or, in other words, between the radially inner and outer conductors. This flux—if uncompensated—induces a circulating current between the radially inner and outer conductors.

According to an aspect, the first and second primary winding portions can comprise a plurality of turns of the conductors around the first or second leg of the ferromagnetic core. The cross section of the conductors is equal in each turn. Turns can be arranged radially or radially and axially as a spiral or helix.

According to an aspect, the conductors of the first and second primary winding portions are foils. The foils can be arranged in a stack of foils and the stack can be arranged around the ferromagnetic core. The parallel connectable foils of the first primary winding portion are connected with the parallel connectable foils of the second primary winding portion, whereby a foil of a radially outer row of the first primary winding portion is connected in series with a conductor of a radially inner row of the second primary winding portion. This transposition between the two series-connected primary winding portions results in opposed magnetic fluxes which in a sum cancel each other or at least significantly reduce the total magnetic fluxes.

According to an aspect, the first primary winding portion and the second primary winding portion each comprise at least 3 conductors. In some embodiments, the second primary winding portion each comprise 4 or 6 conductors.

Preferably, the plurality of conductors of the first primary winding portion each are continually single-piece conductors. Accordingly, the plurality of conductors of the second primary winding portion each are continually single-piece conductors. Each conductor of the first primary winding portion can be connected in series with the corresponding conductor of the second primary winding portion by, for example, a cable lug. At an external in- or output all conductors can fit in a single cable lug for each winding portion resulting in a parallel circuit of the parallel connectable conductors.

According to an aspect, the electrical component further comprises a first external electrical connector connected in series with the conductors of the first primary winding portion and a second external electrical connector connected in series with the conductors of the second primary winding portion, wherein the first and second primary winding portions are located between the first and second external electrical connector. First and second external electrical connectors can be cable lugs.

According to an embodiment, the electrical component is a transformer and further comprises a secondary winding with a first secondary winding portion arranged around the first leg of the ferromagnetic core and a second secondary winding portion arranged around the second leg of the ferromagnetic core.

According to an embodiment, the transformer is an MTF. Typical frequencies and currents in an operational state for which the transformer can be adapted can be, for example 0.5 kHz to 50 kHz, especially 10 kHz to 20 kHz, and currents in the range of 20 A to 2000 A, especially 100 A to 2000 A.

The secondary winding can be the inner winding and the primary winding can be the outer winding. The primary winding can be a high voltage winding and the secondary winding can be a low voltage winding. According to a further development of the invention, the first and second secondary winding portions can comprise a plurality of parallel connectable conductors and each conductor of first secondary winding portion can be connected in series with a corresponding conductor of the second secondary winding portion analogously to the primary winding described herein. Alternatively, the first and second secondary winding portions can be connected in any possible way if the magnetic flux does not influence the workability of the electronic device. A low influence is typical for a LV winding.

According to another embodiment, the electrical component is an inductor.

According to an aspect, the first primary winding portion and the second primary winding portions are essentially geometrically symmetric, especially, the number of conductors in the first and second winding portions is equal, the number of radial rows in the cross section is equal, the number of axial rows in the cross section is equal, and/or the number of turns around the leg of the ferromagnetic core is equal. The more the first primary winding portion and the second primary winding portions equal each other, the more magnetic flux between parallel connectable conductors of the first and second primary winding portions can be canceled by the suggested series connection of conductors.

Axial and radial rows are defined by the axial and radial direction. The radial direction is the direction pointing from a leg of the ferromagnetic core to the primary winding portion. The axial direction is perpendicular to the radial direction is pointing along the leg of the ferromagnetic core.

A primary winding portion can comprise a plurality of turns around the leg of the ferromagnetic core, wherein the cross section of the plurality of parallel connectable conductors is essentially equal in each turn. Turns can be arranged in radial or axial direction or both. In one example, the primary winding portion comprises a plurality of parallel connectable foils with a cross section, wherein the conductors are radially displaced with respect to each other at radial row positions. The primary winding portion can comprise, for example, 10 turns in a radial direction. In each turn, the cross section of the foils is essentially equal, meaning the radial row position of each foil is constants with respect to each other. In another example, the primary winding portion comprises a plurality of parallel connectable litz wires. The primary winding portion comprises, for example, 10 turns arranged in axial direction, so that the cable formed of the group of litz wires forms a spiral. In each turn, the cross section of the cable is essentially equal, meaning the radial row position and the axial row position of each litz wire inside the cable is constants with respect to each other.

According to an embodiment, the first primary winding portion and the second primary winding portion each comprise a cable formed of a plurality of litz wires, wherein the plurality of parallel connectable conductors are a plurality of parallel connectable litz wires. A conductor is identified as a litz wire. Litz wires typically consists of multiple strands insulated electrically from each other. The strands are typically twisted. Each strand can have a diameter of, for example, 0.2 mm and the litz wire can consist of more than 100 litz wire strands. The litz wire can have an essentially rectangular cross section of, for example, 6 mm×12 mm.

Preferably, the plurality of parallel connectable conductors are arranged around the ferromagnetic core in a cross section with the conductors being radially displaced with respect to each other at radial row positions, wherein the radial positions, and typically also the axial positions, remain unchanged along the length of the first or second primary winding portion, In the example of litz wires, which is are grouped in a cable, the litz wires are not twisted. A cable can contain a plurality of litz wires, for example, 4 or 6 litz wires. Thus, a cross section of the plurality of litz wires remains constant, so that a litz wire, which is, for example, located radially outside in the primary winding, remains radially outside along the full length of the first or second primary winding portion.

According to an embodiment, the first primary winding portion and the second primary winding portion each are essentially helical symmetric. The cross section of the plurality of parallel connectable conductors winds around a central axis. The first primary winding portion and the second primary winding portion each can have an essentially cylindrical shape.

According to another embodiment, the first primary winding portion and the second primary winding portion each can have an essentially spiral symmetry The first primary winding portion and the second primary winding portion can have a spiral or helical symmetry. The cross section of the plurality of parallel connectable conductors winds around a central axial axis. The cross section can also wind along the central axial axis, for example, if the conductors are litz wires.

According to an aspect, each of the plurality of parallel connectable conductors has a defined radial and possibly axial position in the cross section of conductors over the full length of the first and/or second primary winding portion. In other word, there are no radial or axial transpositions of conductors inside the first and/or second primary winding portion.

The first and second primary winding portions can be formed by litz wires arranged as a closed packed spiral around the first and second leg of the ferromagnetic core, respectively.

According to this embodiment or other embodiments in which also axial rows of conductors exist in the cross section, additional radial flux can occur in the parallel connectable conductors because the H-field has a radial component near the axial top and bottom end of the first and second primary winding portion. The radial flux is typically smaller than the axial flux. However, the radial H-component is asymmetric, pointing e.g. radially outward at the top of an axial direction of the first and second primary winding portion and inward at the bottom or vice versa. In contrast, the axial H-component is symmetric, pointing in the same direction, e.g. vertically up at the top and at the bottom. Hence, the radial components of the resulting flux will cancel each other without a transposition.

According to an embodiment, the cable comprises 4 litz wires, wherein the litz wires of the first and second primary winding portions are arranged in the cable around the ferromagnetic core in a cross section comprising 2 radial rows and 2 axial rows, wherein an axial direction defines an axial top row and an axial bottom row. A litz wire of a top row of the first primary winding portion is connected in series with a litz wire of a top row of the second primary winding portion and a litz wire of a bottom row of the first primary winding portion is connected in series with a litz wire of a bottom row of the second primary winding portion.

A cable comprising a plurality of litz wires with 4 litz wires can be typically used in applications wherein in an operating state, a current of at least 100 A, typically more than 300 A, flow through the first and second primary winding portions.

According to another aspect, the cross section of the plurality of conductors can comprise 3 or more axial rows. This introduces an additional radial flux, if the conductors are not transposed axially, because the magnitude of the radial flux decreases in axial direction from an end of the primary winding towards the middle. Thus, according to an embodiment the litz wires, or other type of conductors, of the first and second primary winding portions are arranged around the ferromagnetic core in a cross section comprising $K \geq 3$ axial rows of litz wires. Each row is arranged at an axial row position, wherein an axial end row position is row position number 1 and an opposite axial end row position is row position number K, wherein each litz wire in the k row position of the first primary winding portion with $1 \leq k \leq K$ is in series connected with a litz wire in the $K+1-k$ row position of the second primary winding portions. This reduces the sum of the magnetic flux between parallel connectable litz wires of the first and second primary winding portions.

BRIEF DESCRIPTION OF THE DRAWINGS

So that the manner in which the above recited features of the present disclosure can be understood in detail, a more particular description of the disclosure, briefly summarized above, may be had by reference to embodiments. The accompanying drawings relate to embodiments of the disclosure and are described in the following.

DETAILED DESCRIPTION OF EMBODIMENTS

Reference will now be made in detail to the various embodiments, one or more examples of which are illustrated in each figure. Each example is provided by way of explanation and is not meant as a limitation. For example, features illustrated or described as part of one embodiment can be used on or in conjunction with any other embodiment to yield yet a further embodiment. It is intended that the present disclosure includes such modifications and variations.

Within the following description of the drawings, the same reference numbers refer to the same or to similar components. Generally, only the differences with respect to the individual embodiments are described. Unless specified otherwise, the description of a part or aspect in one embodiment can apply to a corresponding part or aspect in another embodiment as well.

Figure 1:
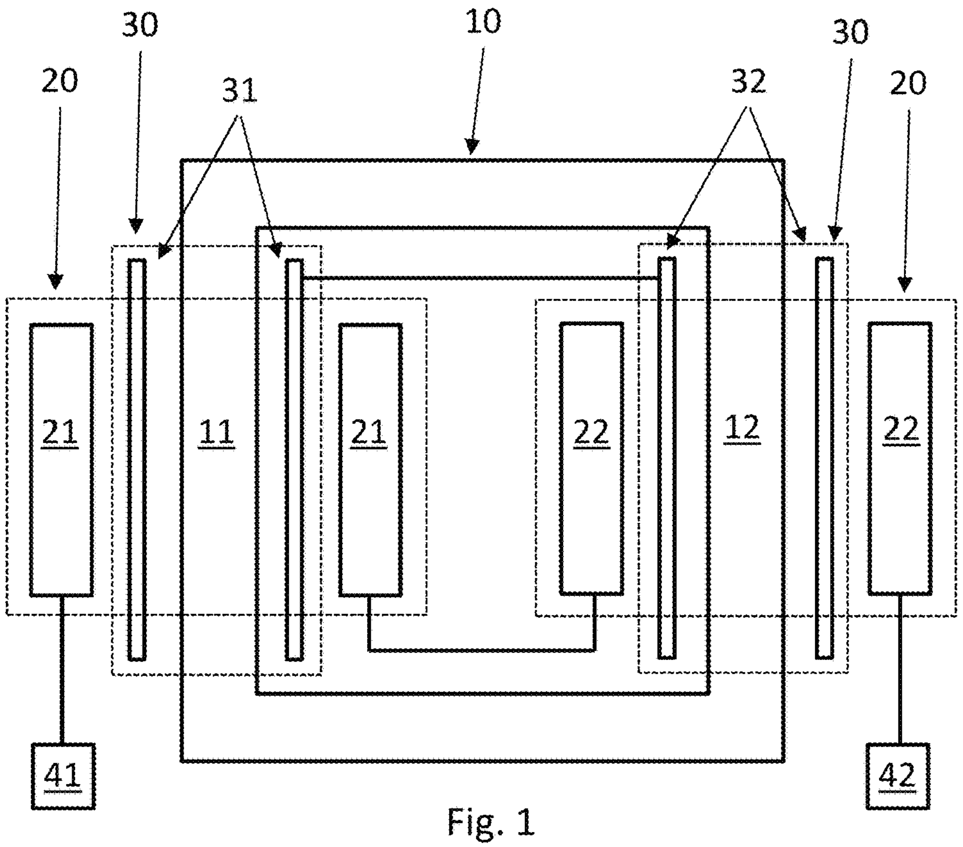
FIG. 1 shows a schematic view of an electrical component, especially a transformer, according to embodiments described herein.

With exemplary reference to FIG. 1, an electrical component is shown. The electrical component of FIG. 1 is a transformer according to an embodiment, which can be combined with other embodiments described herein. Especially according to other embodiments, the electrical component can be an inductor. The electrical component comprises: a ferromagnetic core 10 with a first and a second leg 11, 12; a primary winding 20 with a first primary winding portion 21 arranged around the first leg 11 of the ferromagnetic core and a second primary winding portion 22 arranged around the second leg 12 of the ferromagnetic core;

wherein the first primary winding portion 21 and the second primary winding portion 22 each comprise a plurality of parallel connectable conductors 1, 2, 3, 4, 5, 6 arranged around the ferromagnetic core in a cross section with the conductors being radially displaced with respect to each other at radial row positions, wherein the number of conductors 1, 2, 3, 4, 5, 6 of the first primary winding portion 21 is equal the number of conductors 1, 2, 3, 4, 5, 6 of the second primary winding portion 22 and each of the conductors 1, 2, 3, 4, 5, 6 of the first primary winding portion 21 is connected in series with one corresponding conductor 1, 2, 3, 4, 5, 6 of the second primary winding portion 22, whereby a conductor 1, 2, 3, 4, 5, 6 of a radially outer row of the first primary winding portion 21 is connected in series with a conductor 1, 2, 3, 4, 5, 6 of a radially inner row of the second primary winding portion 22, thereby reducing the sum of the magnetic flux between parallel connectable conductors 1, 2, 3, 4, 5, 6 of the first primary winding portion 21 and parallel connectable conductors 1, 2, 3, 4, 5, 6 of the second primary winding portion 22.

The electrical component of FIG. 1 is a transformer and further comprises a secondary winding 30 with a first secondary winding portion 31 arranged around the first leg 11 of the ferromagnetic core and a second secondary winding portion 32 arranged around the second leg 12 of the ferromagnetic core. Primary and secondary winding are separated by an insulation.

Because of insulation, the primary winding portions 21/22 are kept at larger distances from the secondary winding portions 31/32 and the ferromagnetic core 10 than the distance between secondary winding portions 31/32 and ferromagnetic core 10. The insulation distances are schematically shown in FIG. 1. This reduces the height of the primary winding portions 21/22 compared to that of the secondary winding portions 31/32. Given the reduced height, the radial thickness of the primary winding 20 must be greater than that of the secondary winding 30 to provide sufficient conductor cross-section. Therefore, each primary winding portion 21, 22 has two or more rows of conductors radially displaced with respect to each.

The ferromagnetic core 10 is adapted for a core type transformer. The shape of the ferromagnetic core 10 can comprise, for example, a C-C, U-U, U-I or an L-L shape, wherein the two components form a ring with an "O"-shape. The ferromagnetic core has at least two legs 11, 12, wherein the legs 11, 12 do not have to be necessary parallel to each other, although it is preferred. Each leg 11, 12 define a separate space for a first primary winding portion 21 and a second primary winding portion 22, so that first and second primary winding portions 21, 22 do spatially not overlap.

According to yet another embodiment, the electrical component can also be an inductor. Typically, inductors only have a primary winding 20. A secondary winding 30 is not needed.

The electrical component can comprise a first external electrical connector 41 in series connected with the conductors 1, 2, 3, 4, 5, 6 of the first primary winding portion 21 and a second external electrical connector 41 in series connected with the conductors 1, 2, 3, 4, 5, 6 of the second primary winding portion 22, wherein the first and second primary winding portions 21, 22 are located between the first and second external electrical connector 41, 42 as shown in FIG. 1. All conductors 1, 2, 3, 4, 5, 6 can be connected in series with the external electrical connector 41, 42, thereby creating a parallel circuit of the conductors 1, 2, 3, 4, 5, 6.

In FIG. 1, the first and second primary winding portions 21, 22 are arranged as outer windings and the first and second secondary winding portions 31, 32 are arranged as inner windings. Preferably, first and second primary winding portions 21, 22 are both either inner or outer windings. Symmetry of first and second primary winding portions 21, 22 is preferred because the magnetic flux cancels each other best if the magnetic flux norm is equal and if the magnetic flux points in the opposite direction.

According to an embodiment, primary winding 20 is an outer winding and a HV winding. The secondary winding 30 is an inner winding and a LV winding.

Figure 2:
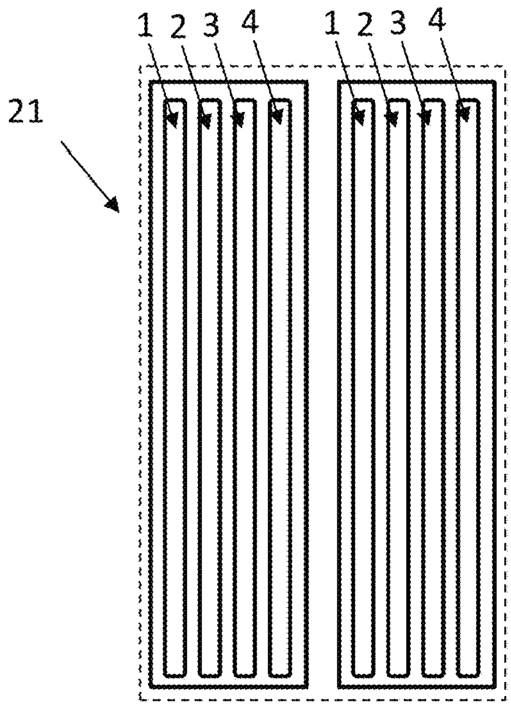
FIG. 2 shows a detailed schematic sectional view of a primary winding portion in a cross section according to embodiments described herein.
Figure 3:
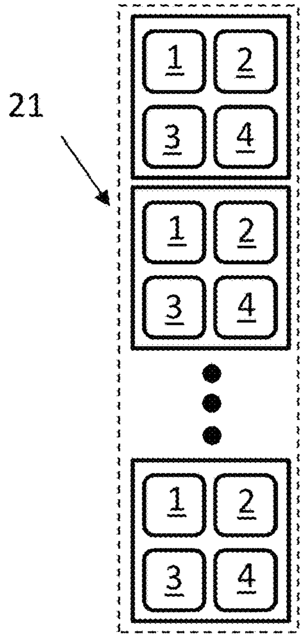
FIG. 3 shows a detailed schematic sectional view of a primary winding portion in a cross section according to another embodiment.

FIGS. 2 and 3 show two different embodiments of parallel connectable conductors arranged in a cross section. A cross section of the first or second primary winding portion 21, 22 is shown. Typically, first and second primary winding portion 21, 22 have the same structure. FIGS. 2 and 3 show a more detailed structure of, for example, the left part of the first primary winding portion 21 shown in FIG. 1.

In FIG. 2, the conductors 1, 2, 3, 4 are foils. The foils 1, 2, 3, 4 are arranged in a cross section. In the embodiment of FIG. 2, the primary winding portion 21 comprises 2 turns, therefore, the cross section is shown two times. The radial position of the foils 1, 2, 3, 4 in the two cross sections is identical.

According to another embodiment shown in FIG. 3, the, conductors 1, 2, 3, 4 are litz wires. The litz wires 1, 2, 3, 4 are arranged in a cable formed of a group of litz wires. The cable has a cross section as shown in FIG. 3. The first primary winding portion 21 comprises several turns of the cable arranged as a spiral. The cross section is essential identical in each turn, especially, radial and axial position of each litz wire is 1, 2, 3, 4 is identical in each cross section. There is no transposition of conductors 1, 2, 3, 4 within a primary winding portion 21, 22. The series connection of conductors 1, 2, 3, 4 of the first and second primary winding portion 21, 22 is further described in FIGS. 5A to 6B.

In the embodiment of FIG. 3, the first primary winding portion 21 comprises several turns of the litz wires arranged as a spiral. According to other embodiments, the first primary winding portion 21 can comprise one or more further radial turns of the cable forming an inner and outer spiral or several spirals radially displaced within each other. Accordingly, the second primary winding portion 22 can have the same structure.

Figure 4A:
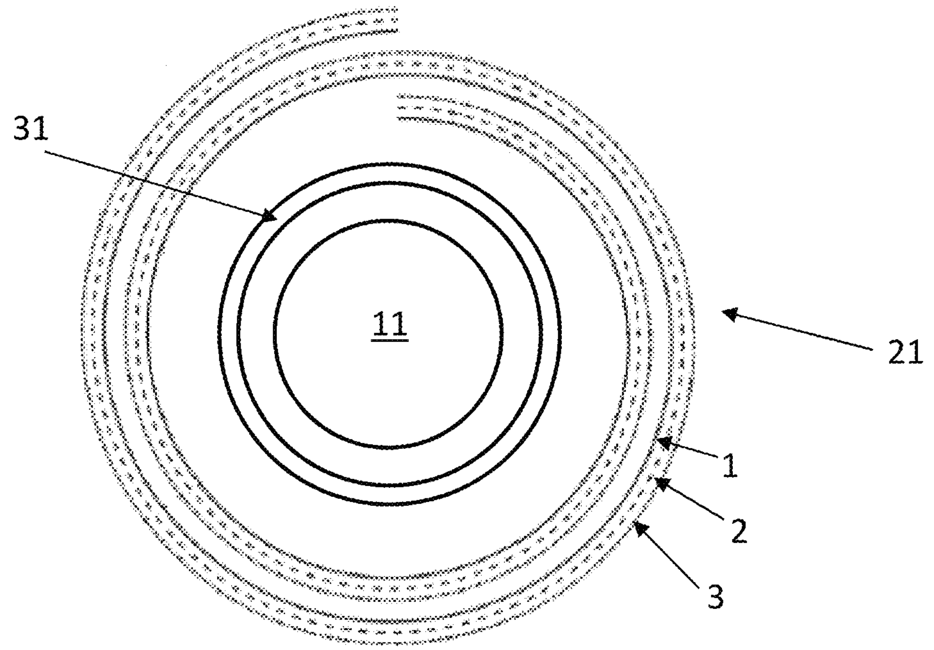
FIGS. 4A and 4B show different embodiments of primary and secondary winding portions around a leg of a ferromagnetic core according to the present disclosure.
Figure 4B:
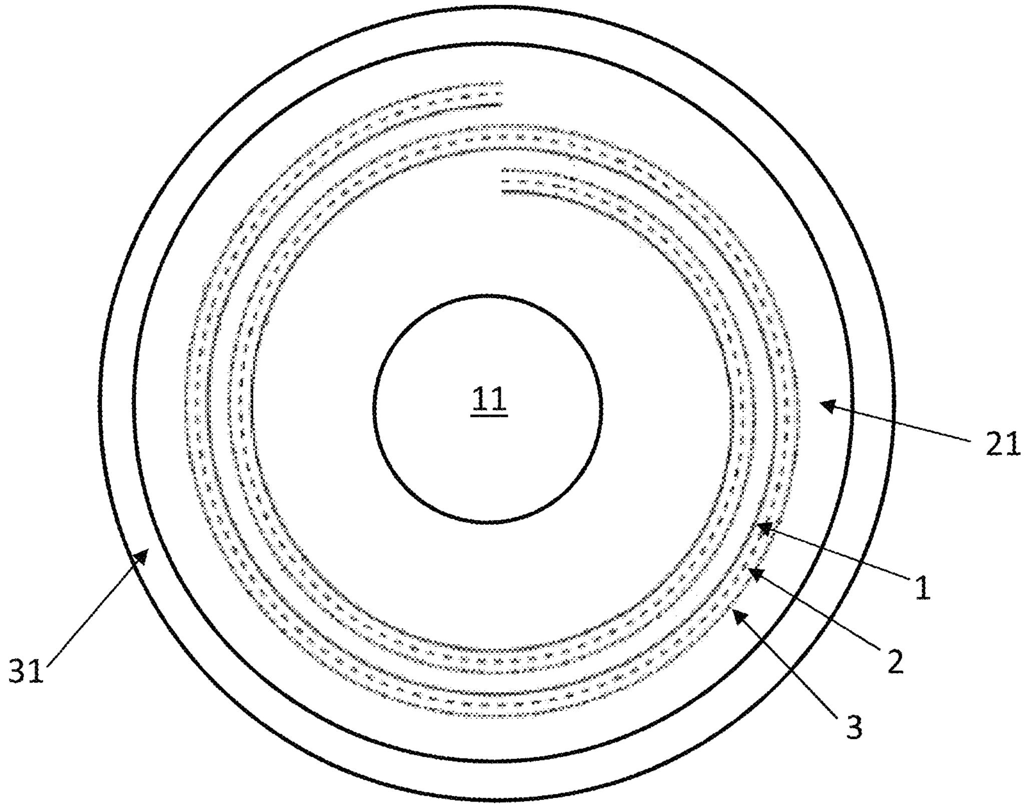

FIGS. 4A and 4B show different embodiments of the first primary and secondary winding portions 21, 31 arranged around a leg 11 of a ferromagnetic core 10 according to embodiments. The electrical component in this embodiment is a transformer and further comprises a secondary winding 30 with a first secondary winding portion 31 arranged around the first leg 11 of the ferromagnetic core and a second secondary winding portion 32 arranged around the second leg 12 of the ferromagnetic core (not shown). In FIG. 4A, primary winding 20 is an outer winding and secondary winding 30 is an inner winding. Accordingly, first secondary winding portion 31 is arranged radially closer to the first leg 11 of the ferromagnetic core 10 than first primary winding portion 21, which is arranged around the first secondary winding portion 31.

In FIGS. 4A and 4B first primary winding portion 21 comprises schematically 2 turns to keep the figure simple. However, first and primary winding portion 21, 22 can comprise several turns, for example between 10 and 20.

In FIG. 4B, primary winding 20 is an inner winding and secondary winding 30 is an outer winding. Therefore, first primary winding portion 21 is arranged radially closer to the first leg 11 of the ferromagnetic core 10 than first secondary winding portion 31. However, independent of which winding 20, 30 is an inner winding, usually first and second primary winding portions 21, 22 are equal, namely either both inner or both outer winding portions.

Between primary and secondary winding 20, 30, there is a magnetic stray field, pointing in axial direction of the windings 20, 30, which is perpendicular to the shown cross sectional view in FIG. 4B. According to Ampere's law, the field increases from zero outside the windings 20, 30 to a maximum between the windings 20, 30. Within the inner winding, it increases in radial direction from zero to the maximum. Within the outer winding, it decreases back to zero. Moving radially outward in the inner winding, there is a normalized field strength of 1 after the first foil 1, of 2 after the second foil 2, etc. According to the present invention, the foils are transposed between the first and second primary winding portion 21, 22 such that the magnetic flux through loops formed by the parallel connectable foils 1, 2, 3 cancel or is at least significantly reduced.

In the embodiment of FIGS. 4A/4B, foil 1 is the radially innermost foil, foil 3 is the radially outermost foil, and foil 2 is located in between. In general, a conductor 1, 2, 3, 4, 5, 6 of a radially outer row of the first primary winding portion 21 is connected in series with a conductor 1, 2, 3, 4, 5, 6 of a radially inner row of the second primary winding portion 22. Therefore at least two foils have to be transposed.

According to an embodiment, first and second primary winding portions 21, 22 are arranged around the ferromagnetic core in a cross section comprising M rows of conductors 1, 2, 3, 4, 5, 6, each row being arranged at a radial row position, with the radially innermost row position being row position number 1 and the radially outermost row position being row position number M, wherein each conductor 1, 2, 3, 4, 5, 6 in the m row position of the first primary winding portion with $1 \leq m \leq M$ is in series connected with a conductor 1, 2, 3, 4, 5, 6 in the $M+1-m$ row position of the second primary winding portion. According to the numbering in FIG. 4A/4B, foils 1 and 3; 2 and 2; and 3 and 1 of the first and second primary winding portions 21, 22, respectively, are connected in series.

According to an embodiment, first primary winding portion 21 and the second primary winding portion 22 each comprise a cable formed of a group of litz wires 1, 2, 3, 4, 5, 6.

Figure 5A:
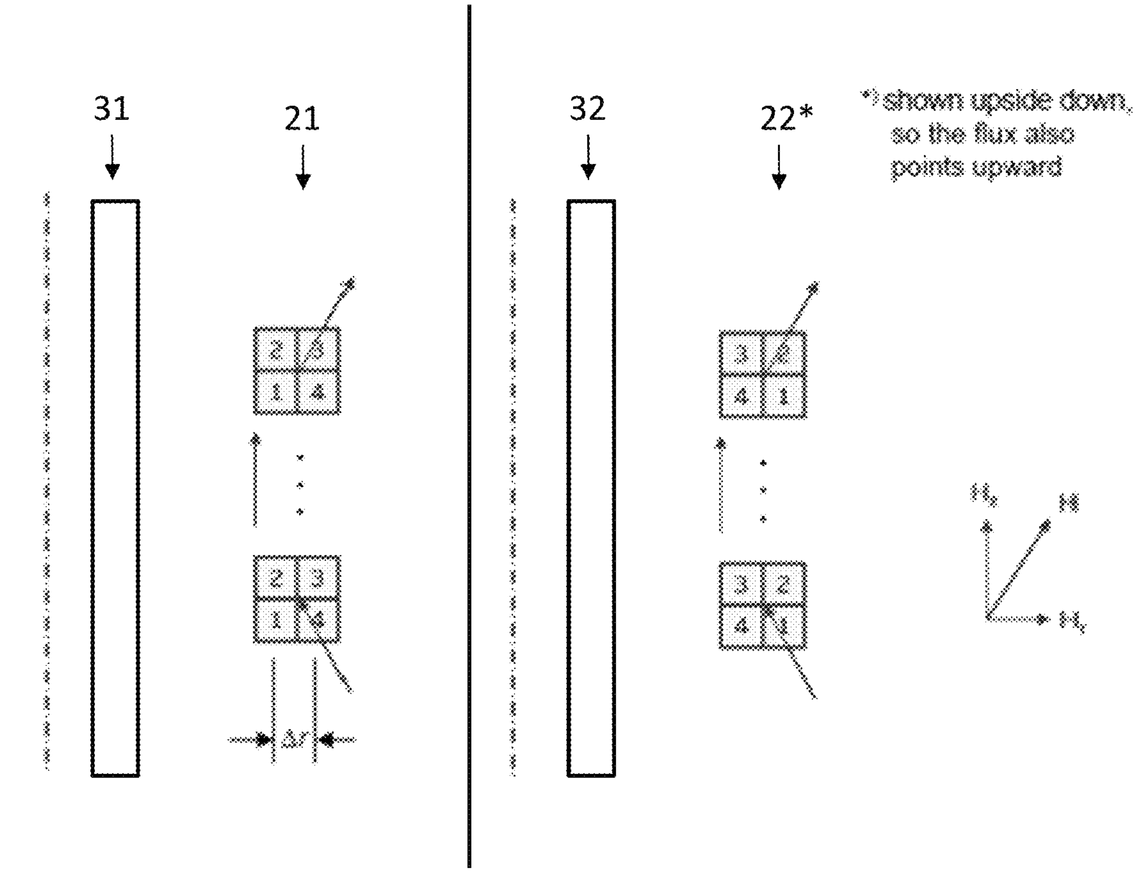
FIGS. 5A and 5B show a schematic diagram of the flux in a primary winding portion and the series connection of conductors of the first and second primary winding portion according to an embodiment.

FIG. 5A shows the magnetic flux in the first and second primary winding portion 21, 22. The axial direction (z) is shown in FIG. 5A from bottom to the top and the radial direction (r) is shown from left to right. The flux has an axial component (Hz) and a radial component (Hr). Axial flux occurs because of a difference in radial distance to the ferromagnetic core 10 and the first and second secondary winding portions 31, 32. In FIG. 5A, the flux is shown upside down so that it points in the same direction. The conductors 1, 2, 3, 4 are arranged in a helix and form first and second primary winding portions 21, 22.

Figure 5B:
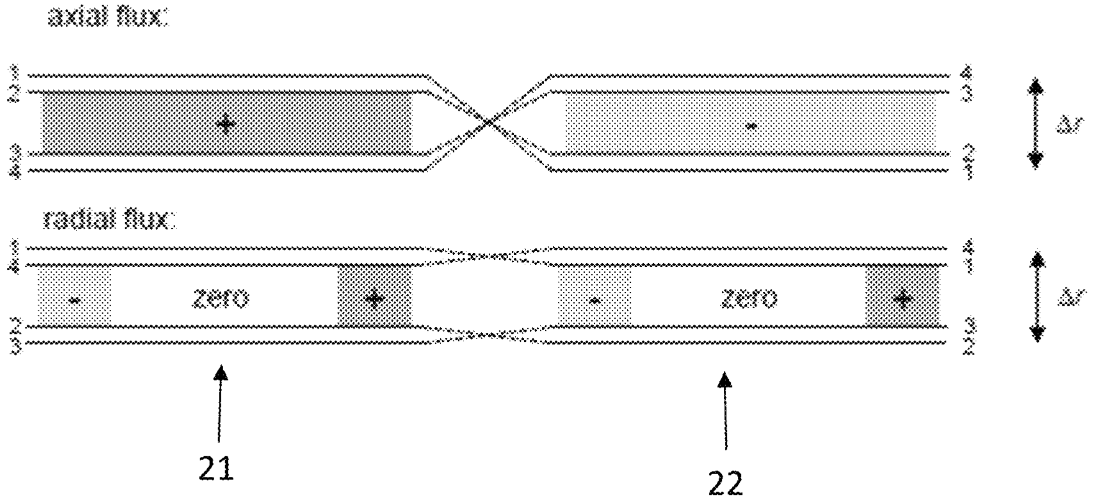

FIG. 5B illustrates the magnetic flux in axial and radial component between parallel connectable conductors of the first and second primary winding portion 21, 22. As illustrated, the magnetic flux points in different directions indicated as plus and minus. The magnetic flux is anti-symmetric. FIG. 5B also shows the connection of the conductors 1, 2, 3, 4 between first and second primary winding portion 21, 22.

In this embodiment, the litz wires 1, 2, 3, 4 of the first and second primary winding portion 21, 22 are connected such that wires 1 and 4 exchange position, and wires 2 and 3 exchange position as shown in FIGS. 5A/5B with the litz wires 1 and 2 being at inner row positions and litz wires 3 and 4 being at outer row positions. The exchange of position between radially inner and outer litz wires 1, 2, 3, 4 does not necessarily include an exchange between top and bottom litz wires 1, 2, 3, 4. In other words, wires 1 and 4 are at the bottom in both primary windings portions 21, 22, while wires 2 and 3 are at the top in both primary windings portions. This serial connection leads to a complete cancellation of axial and radial magnetic flux between all loops formed by the 4 parallel litz wires 1, 2, 3, 4. Therefore, circulating currents due to such fluxes are eliminated.

Figure 6A:
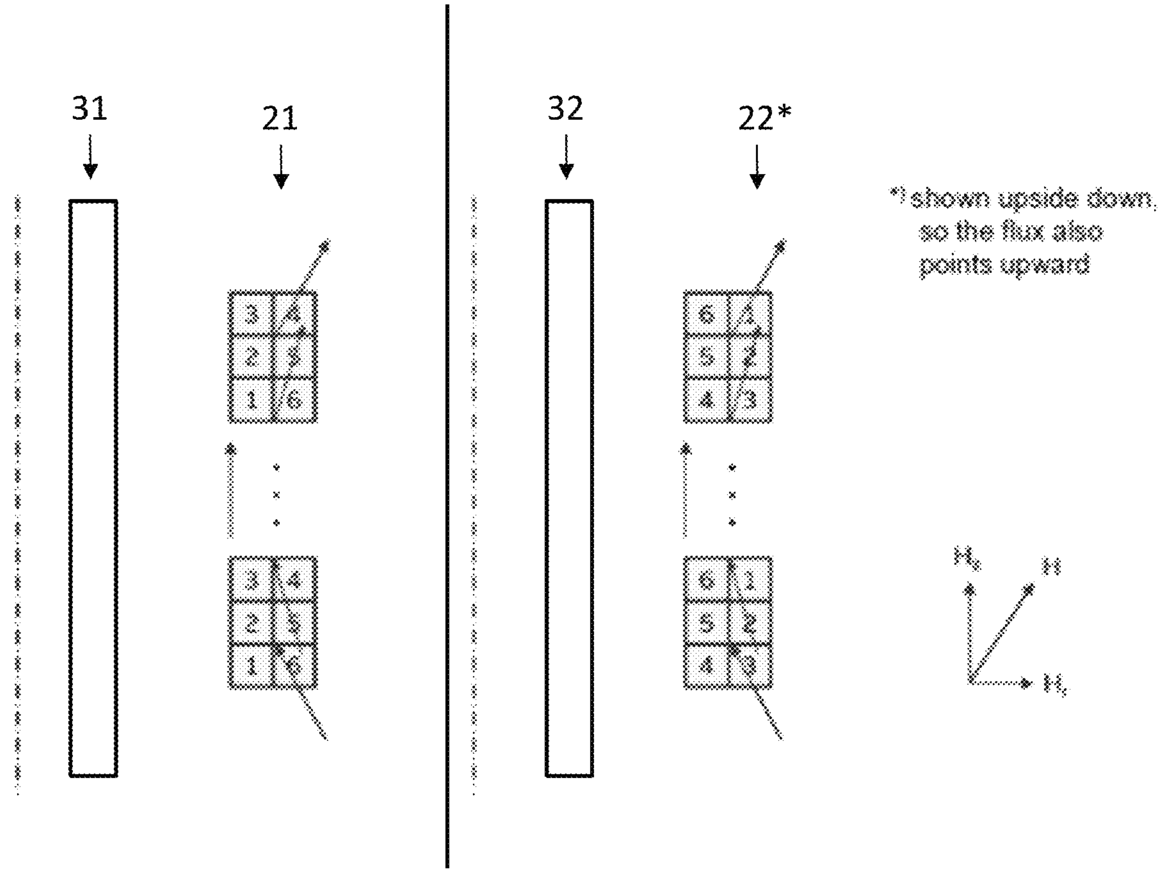
FIGS. 6A and 6B show another schematic diagram of the flux in a primary winding portion and the series connection of conductors of the first and second primary winding portion according to another embodiment.
Figure 6B:
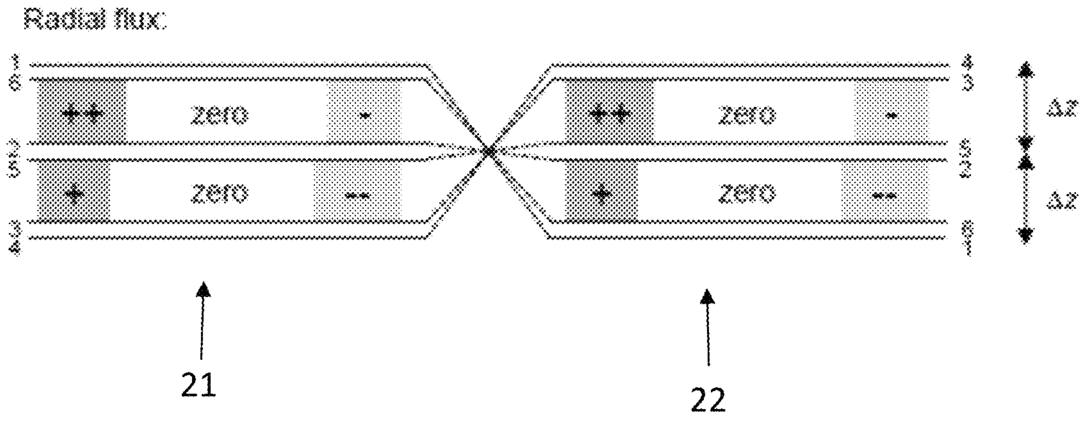

FIGS. 6A and 6B show another embodiment, wherein the primary winding comprises six conductors 1, 2, 3, 4, 5, 6. Compared to the embodiment of FIG. 5A, the embodiment of FIG. 6A comprises two additional conductors 5, 6. The conductors 1, 2, 3, 4, 5, 6 are arranged in a cross section with two radial rows and three axial rows. Conductors 1, 2 and 3 are located at radially inner positions and conductors 4, 5 and 6 are located at radially outer positions in the cross section of conductors. The compensation of axial fluxes works like in FIGS. 5A and 5B. The compensation of radial fluxes doesn't work perfectly anymore, if there is no transposition in axial direction. This is because the magnitude of radial flux decreases in axial direction from the end of the primary winding towards the middle. The flux is sketched in FIGS. 6A. The right side of FIG. 6A is shown upside down analog to FIG. 5A. For example, at the bottom of the first primary winding portion 21, the radial flux between litz wires {1, 6} and litz wires {2, 5} is larger than the radial flux between litz wires {2, 5} and litz wires {3, 4}. This is indicated by the change of angle of the H-field vector.

According to this embodiment, the cross section of conductors comprises $K \geq 3$ axial rows of litz wires 1, 2, 3, 4, 5, 6 as shown in FIG. 6A. Each row is arranged at an axial row position, wherein an axial end row position is row position number 1 and an opposite axial end row position is row position number K, wherein each litz wire 1, 2, 3, 4, 5, 6 in the k row position of the first primary winding portion 21 with $1 \leq k \leq K$ is in series connected with a litz wire 1, 2, 3, 4, 5, 6 in the $K+1-k$ row position of the second primary winding portions 22, thereby reducing the sum of the magnetic flux between parallel connectable litz wires 1, 2, 3, 4, 5, 6 of the first and second primary winding portions 21, 22.

FIG. 6B shows the serial connection of the conductors 1, 2, 3, 4, 5, 6 of the first and second primary winding portion 21, 22.

REFERENCE NUMBERS

1 conductor
2 conductor
3 conductor
4 conductor
5 conductor
6 conductor
10 ferromagnetic core
11 first leg
12 second leg
20 primary winding
21 first primary winding portion
22 second primary winding portion
30 secondary winding
31 first secondary winding portion
32 second secondary winding portion
41 first external electrical connector
42 second external electrical connector

The invention claimed is:

1. An electrical component, comprising:

a ferromagnetic core with a first and a second leg;

a primary winding with a first primary winding portion arranged around the first leg of the ferromagnetic core and a second primary winding portion arranged around the second leg-of the ferromagnetic core;

wherein the first primary winding portion and the second primary winding portion each comprise a plurality of conductors connectable in parallel and arranged around the ferromagnetic core in a cross section with the conductors being radially displaced with respect to each other at radial row positions, wherein the number of conductors of the first primary winding portion is equal the number of conductors of the second primary winding portion and each of the conductors of the first primary winding portion is connected in series with one corresponding conductor of the second primary winding portion, wherein a conductor of a radially outer row of the first primary winding portion is connected in series with a conductor of a radially inner row of the second primary winding portion, thereby reducing the sum of the magnetic flux between parallel connectable conductors of the first primary winding portion and parallel connectable conductors of the second primary winding portion.

2. The electrical component according to claim 1, wherein the electrical component is an inductor.

3. The electrical component according to claim 1, wherein the electrical component is a transformer and further comprises a secondary winding with a first secondary winding portion arranged around the first leg of the ferromagnetic core and a second secondary winding portion arranged around the second leg of the ferromagnetic core.

4. The electrical component according to claim 1, wherein the first and second primary winding portions are arranged around the ferromagnetic core in a cross section comprising M rows of conductors, each row being arranged at a radial row position, with the radially innermost row position being row position number 1 and the radially outermost row position being row position number M, wherein each conductor in the $m^{th}$ row position of the first primary winding portion with $1 \leq m \leq M$ is in series connected with a conductor in the $(M+1-m)^{th}$ row position of the second primary winding portion.

5. The electrical component according to claim 3, wherein the secondary winding is a low voltage winding and the primary winding is a high voltage winding.

6. The electrical component according to claim 1, wherein the first primary winding portion and the second primary winding portion each comprise at least 3, preferably at least 4, conductors.

7. The electrical component according to claim 1, wherein in an operational state of the electrical component, a current of at least 20 A, especially at least 100 A, flows through the primary winding.

8. The electrical component according to claim 1, wherein the electrical component comprises a first external electrical connector in series connected with the conductors of the first primary winding portion and a second external electrical connector in series connected with the conductors of the second primary winding portion, wherein the first and second primary winding portions are located between the first and second external electrical connector.

9. The electrical component according to claim 1, wherein the first primary winding portion and the second primary winding portion each comprise a cable formed of a group of litz wires and wherein the plurality of parallel connectable conductors are a plurality of parallel connectable litz wires.

10. The electrical component according to claim 9, wherein the cable comprises 4 litz wires and wherein the litz wires of the first and second primary winding portions are arranged around the ferromagnetic core in a cross section comprising 2 radial rows and 2 axial rows, wherein an axial direction defines an axial top row and an axial bottom row, wherein a litz wire of a top row of the first primary winding portion is connected in series with a litz wire of a top row of the second primary winding portion and a litz wire of a bottom row of the first primary winding portion is connected in series with a litz wire of a bottom row of the second primary winding portion.

11. The electrical component according to claim 9, wherein the litz wires of the first and second primary winding portions are arranged around the ferromagnetic core in a cross section comprising $K \geq 3$ axial rows of litz wires, each row being arranged at an axial row position, wherein an axial end row position is row position number 1 and an opposite axial end row position is row position number K, wherein each litz wire in the $k^{th}$ row position of the first primary winding portion with $1 \leq k \leq K$ is in series connected with a litz wire in the $(K+1-k)^{th}$ row position of the second primary winding portions, thereby reducing the sum of the magnetic flux between parallel connectable litz wires of the first primary winding portion and parallel connectable litz wires of the second primary winding portion.

12. The electrical component according to claim 11, wherein the cable comprises 6 litz wires, wherein the litz wires of the first and second primary winding portions are arranged around the ferromagnetic core in a cross section comprising 2 radial rows and 3 axial rows.

13. The electrical component according to claim 1, wherein the conductors of the first and second primary winding portions are foils.

14. The electrical component according to claim 3 wherein the first secondary winding portion and the second secondary winding portion are parallel connectable.

15. The electrical component according to claim 3 wherein the first secondary winding portion and the second secondary winding portion are connected in series.

* * * * *